US010733550B2

(12) United States Patent
Maheshwari et al.

(10) Patent No.: US 10,733,550 B2
(45) Date of Patent: Aug. 4, 2020

(54) SYSTEM AND METHOD FOR OPTIMIZING SUPPLY OF RENTAL VEHICLES

(71) Applicant: MASTERCARD INTERNATIONAL INCORPORATED, Purchase, NY (US)

(72) Inventors: Sourabh Kumar Maheshwari, Uttar Pradesh (IN); Ankur Arora, New Delhi (IN); Jaipal Singh Kumawat, Sikar (IN); Teja Chebrole, Ahmedabad (IN); Shweta Khattar, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 388 days.

(21) Appl. No.: 15/676,038

(22) Filed: Aug. 14, 2017

(65) Prior Publication Data

US 2018/0053133 A1 Feb. 22, 2018

(30) Foreign Application Priority Data

Aug. 16, 2016 (IN) .............................. 201611027890

(51) Int. Cl.
*G06Q 10/06* (2012.01)
*G06Q 30/02* (2012.01)
*G06Q 30/06* (2012.01)

(52) U.S. Cl.
CPC ... *G06Q 10/06315* (2013.01); *G06Q 30/0202* (2013.01); *G06Q 30/0645* (2013.01)

(58) Field of Classification Search
CPC .............................. G06Q 40/00; G06Q 40/06
USPC ......................................................... 705/7.25
See application file for complete search history.

(56) References Cited

U.S. PATENT DOCUMENTS

| 5,948,040 A * | 9/1999 | DeLorme | G01C 21/36 340/990 |
| 8,145,535 B2 * | 3/2012 | Goel | G06Q 10/02 705/26.1 |
| 2011/0022425 A1 * | 1/2011 | Block | G06Q 20/206 705/5 |
| 2011/0231225 A1 * | 9/2011 | Winters | G06Q 30/0201 705/7.29 |
| 2011/0288918 A1 * | 11/2011 | Cervenka | G06Q 20/40 705/14.17 |
| 2012/0059702 A1 * | 3/2012 | Yoder | G06Q 30/0215 705/14.17 |
| 2013/0103449 A1 * | 4/2013 | McGinn | G06Q 10/103 705/7.15 |
| 2014/0172506 A1 * | 6/2014 | Parsell | G06Q 30/0204 705/7.33 |

* cited by examiner

*Primary Examiner* — Romain Jeanty
(74) *Attorney, Agent, or Firm* — Harness, Dickey & Pierce, P.L.C.

(57) ABSTRACT

A system and a method for optimizing supply of rental vehicles, comprising receiving customer data associated with a plurality of customers from a plurality of sources; classifying the customers into a plurality of segments, based on said data, each segment being indicative of vehicle rental preferences of customers in the segment; determining whether any customers have already opted for a vehicle rental; determining the destination and source location of the customer and predicting likely vehicle demand for different vehicles based on said classification and said determination.

12 Claims, 4 Drawing Sheets

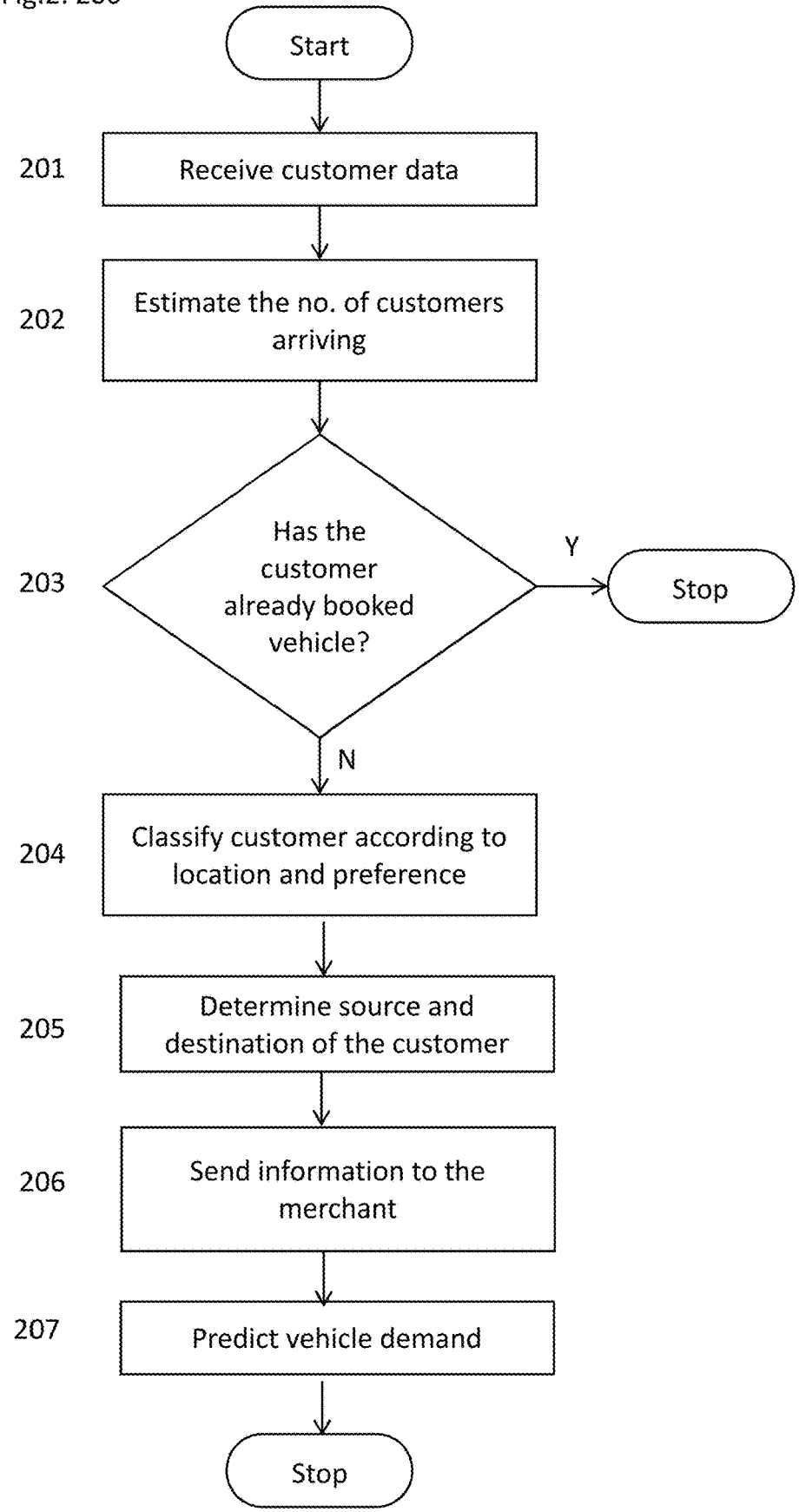
Fig.2: 200

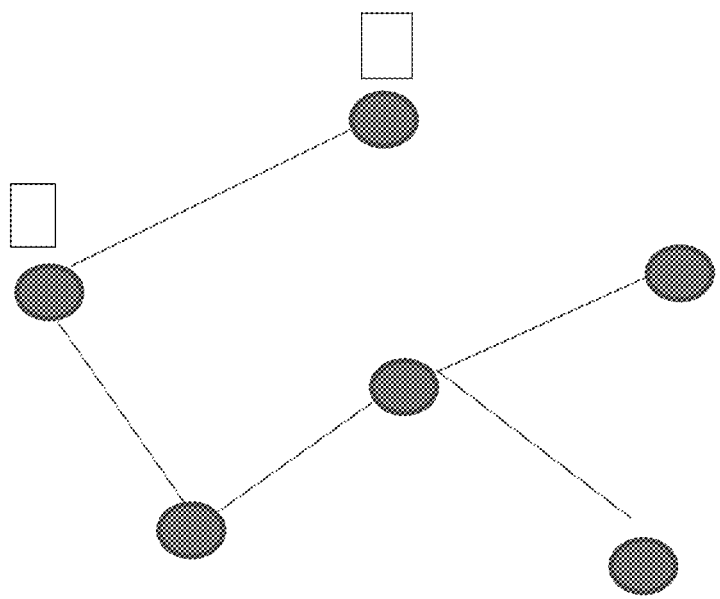
Fig 3: 300

SYSTEM AND METHOD FOR OPTIMIZING SUPPLY OF RENTAL VEHICLES

CROSS-REFERENCE TO RELATED APPLICATION

This application claims the benefit of and priority to Indian Patent Application No. 201611027890 filed Aug. 16, 2016. The entire disclosure of the above application is incorporated herein by reference.

FIELD

The disclosure relates to a system and method for optimizing supply of rental vehicles.

BACKGROUND

This section provides background information related to the present disclosure which is not necessarily prior art.

Rental vehicle agencies typically forecast demand at a coarse level according to historical data, for example, based on past seasonal fluctuations in demand. However, they may not have a detailed understanding of the kind of customers visiting their location in a particular season (at airport locations) and the type of vehicle they would need, for example, whether a customer would require a Luxury car or some other type of car. Customers may therefore face a problem of less availability of the desired type of vehicles around the rental location.

SUMMARY

This section provides a general summary of the disclosure, and is not a comprehensive disclosure of its full scope or all of its features. Aspects and embodiments of the disclosure are set out in the accompanying claims.

A need is felt to use customer data using their Addendum (Flights and Vehicle renting) data, to rightly estimate the number of travelers arriving at airport locations and travelers who may require car rental services. Further, there is also a need to classify those travelers into various segments (Luxury, Economy etc.) to identify the car type they may book for. The present disclosure addresses these issues.

The present disclosure relates to a system and a method for optimizing supply of rental vehicles, comprising a processor; and a memory disposed in communication with the processor and storing processor executable instructions for configuring the processor to receive customer data associated with a plurality of customers from a plurality of sources, classify the customers into a plurality of segments, based on said data, each segment being indicative of vehicle rental preferences of customers in the segment, determine whether any customers have already opted for a vehicle rental; and predict likely vehicle demand for different vehicles based on said classification and said determination.

Some embodiments of the present disclosure provide a solution to merchants by predicting demand based on addendum (flight) data and vehicle rental data to suggest whether or not the traveler would require car rental service.

Some embodiments of the present disclosure predict the kind of Car the customer would like to book, e.g., Luxury or Mid-Priced Car with the use of Experian data (Automobile data).

Yet another object of the present disclosure is to determine the demand forecasting for the type of Car and number of Cars required in particular area using lodging data.

It allows the merchants to maintain a fleet of Cars based on the seasonality so that demand can be managed. Further, the peak season can be identified and customer segmentation can be done using the transaction data. This will help in managing the demand of particular kinds of cars at a particular location and based on historical data, car rental companies can estimate how many cars in segment are required at each pickup and drop-off point.

It is also the object of the present disclosure to estimate the number of people who are going to drop their car at a particular point and thus reduce the number of cars required at each node.

Further areas of applicability will become apparent from the description provided herein. The description and specific examples and embodiments in this summary are intended for purposes of illustration only and are not intended to limit the scope of the present disclosure.

DRAWINGS

The detailed description is described with reference to the accompanying figures. The drawings/figures described herein are for illustrative purposes only of selected embodiments and not all possible implementations, and are not intended to limit the scope of the present disclosure. In the figures the left-most digit of a reference number identifies the figure in which the reference number first appears. The same numbers are used throughout the drawings to reference like features and components.

FIG. 2 illustrates a flow diagram of an exemplary method of optimizing supply of rental vehicles.

FIG. 3 illustrates an exemplary map of pick-up and drop-off at a series of nodes.

DETAILED DESCRIPTION

Figure 1A:
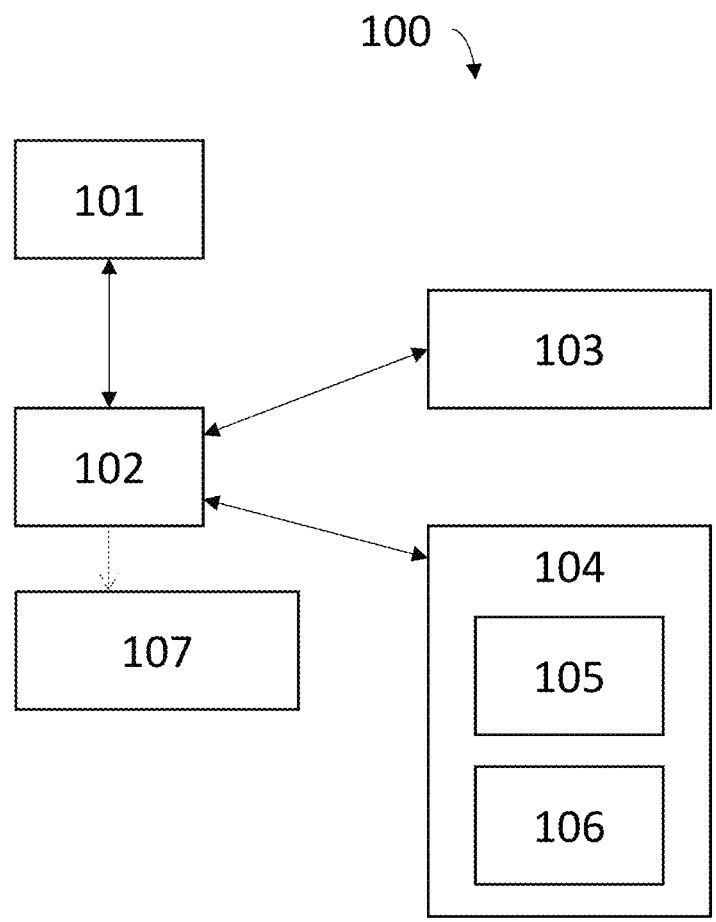
FIG. 1 illustrates a block diagram of an exemplary system for optimizing supply of rental vehicles.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements. In addition, the description and specific examples included herein are intended for purposes of illustration only and are not intended to limit the scope of the present disclosure.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

FIG. 1 illustrates a block diagram of an exemplary system (100) for optimizing supply of rental vehicles. FIG. 1(a) illustrates a system (100) representing database connection comprising a communication device (101) which is configured to extract required data information from the server (102). The server (102) is coupled with the Addendum database (103) and Transaction database (104). The Addendum database (103) comprises passenger plane addendum and vehicle rental addendum data. The passenger place addendum comprises information about the passenger travelling including the transaction data and the sequence number which creates a key unique to the passenger. It comprises fields including, but not limited to, origin airport, destination airport, type of class (business, first or economy), travel data and time, transaction date and sequence number. The vehicle rental addendum data comprises information regarding car rentals. Again here, same as in the passenger plane addendum, a unique key is created using transaction data and the sequence number. It comprises fields including, but not limited to, transaction data, sequence number, pick up location, return location, check out data and return data. The Transaction database (104) comprises transaction attributes for each transaction done through the network (107). It comprises fields including, but not limited to, account number, the amount spent by the cardholder, the industry name in which the cardholder spends, the transaction date and the sequence number. The account number is encrypted and is unique to each cardholder. The Transaction database (104) further comprises a Passenger account holder database (105) and a Passenger history database (106). The Passenger account holder database (105) comprises a list of passengers having unique accounts assigned to them. The passenger history database (106) comprises passenger transaction history which also serves as an indicator towards the behavioral pattern of the passenger when it comes to transactions.

Figure 1B:
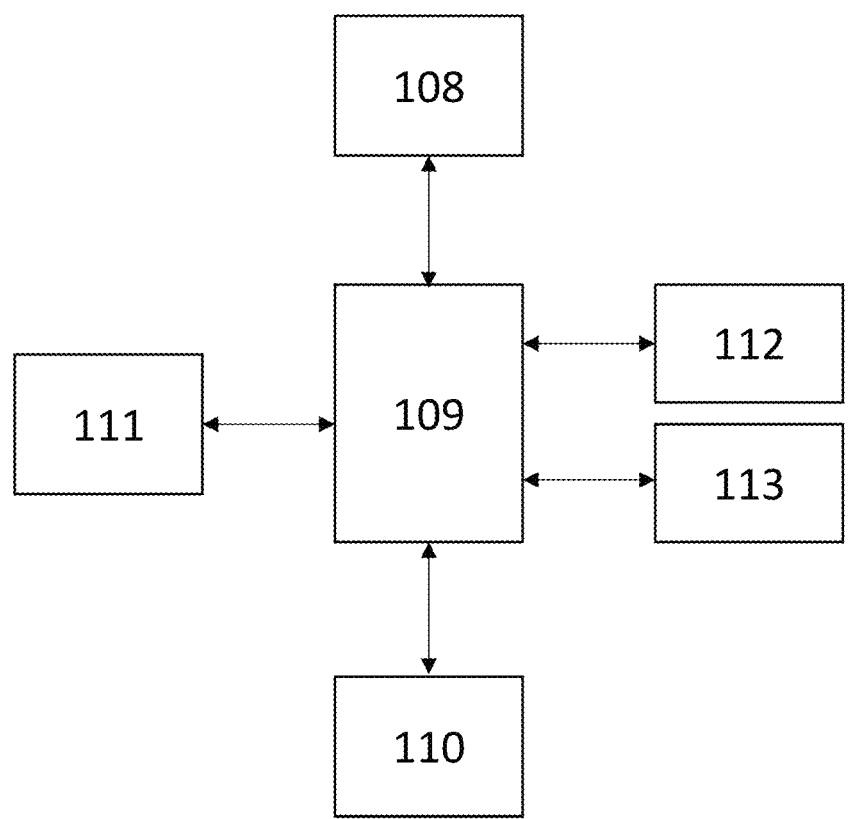

FIG. 1(b) illustrates hardware configuration inside the server (102). The server (102) comprises input/out (I/O) device (108) which is used by the end user to interface with the system (100). There is also present a central processing unit (109) which is coupled to the I/O (108), the volatile RAM (112), the ROM (113), the secondary storage (111) and the network (110). RAM (112) allows data information to be accessed in almost the same amount of time irrespective of the physical location of data inside the memory and is volatile. ROM (113) is usually hardwired and is difficult to alter or cannot be altered at all. The secondary storage (111) is a non-volatile memory which is an external device.

FIG. 2 (200) illustrates a flow diagram of an exemplary method of optimizing supply of rental vehicles. The system receives customer data from a variety of sources (201), i.e. from the lodging data, transaction data, and addendum (Flights and Vehicle renting) data residing inside the addendum database (103), as mentioned in the preceding figures.

Thus the number of travelers arriving at airport locations and travelers who may require car rental services is estimated (202). This is done by collecting The Passenger plane addendum and the Vehicle Rental Addendum data from the addendum database (103).

The Passenger Plane Addendum data may include the following information about Passengers: Origin Airport, Destination Airport, Class (Business, First, Economy), Travel Date and Time, Transaction Date and/or the Sequence Number. Using this above information from the passenger plane addendum inside addendum database (103), the number of passengers arriving to the destination Airport on a particular day is identified. Since the passenger plane addendum comprises the information about the passenger travelling, said number can be determined, The Vehicle Rental Addendum data has information regarding Car rentals and may include: Transaction Date, Sequence Number, Pickup Location, Return Location, and/or Checkout Date. Both Vehicle and Passenger Plane Addendum data includes the transaction date and sequence number. Using these columns, the addendum data is associated with transaction data.

The transaction data includes, but is not limited to, the transaction date and the transaction behavior of each passenger which determines the segmentation of the passengers.

The data from all the sources is merged to identify whether the passenger travelling to a destination Airport has already opted for Car Rental so that such passengers can be excluded (203). The data is merged from all the sources, i.e., vehicle addendum data, passenger plane data residing inside the addendum database (103) and transaction data residing inside the transaction database (104). The passenger travelling to a destination Airport may opt-in for Car Rental and based on Passenger transactions history, Airline Class (Business, First, Economy); the Passengers are classified into Luxury or Economy Class (204). The current location, i.e., the source location and the destination location of the customer, are determined as per what is described under FIG. 2 given herein under below (205).

Such information is provided in advance to Vehicle Rental Merchants in an aggregated form (206). Various customers and travelers are classified into various segments (Luxury, Economy etc.) based on the transaction history data residing inside the passenger history database (106) in the car rental industry and the airline class to identify the car type they may book for (204) based on the customer data received to predict the likely vehicle they may require at the next predicted location (207).

FIG. 3 (300) illustrates a map of pick-up and drop-off from a series of nodes, including two particular nodes labelled A and B. These may be pick-up and drop-off locations of a particular passenger and a series of such data is used to deduce travel behavior of the passenger and hence to better determine the vehicle availability at a particular location. By estimating the number of people who are going to drop their car at a particular point we can reduce the number of cars required at each node. For example, in the network given below, if a customer drops-off a mid-segment car from point A to B we can reduce the number of mid segment cars required at B from 2 to 1.

As will be appreciated by one of skill in the art, the present disclosure may be embodied as a method, system, or computer program product. Accordingly, the present disclosure may take the form of an entirely hardware embodiment, a software embodiment or an embodiment combining software and hardware aspects. Furthermore, the present disclosure may take the form of a computer program product on a computer-usable storage medium having computer-usable program code embodied in the medium.

Furthermore, the present disclosure was described in part above with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus, like a scanner/check scanner, to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and schematic diagrams illustrate the architecture, functionality, and operations of some embodiments of methods, systems, and computer program products for managing security associations over a communication network. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments of the disclosure. Although specific terms are employed, they are used in a generic and descriptive sense only and not for purposes of limitation, the scope of the disclosure being defined by the following claims.

With that said, and as described, it should be appreciated that one or more aspects of the present disclosure transform a general-purpose computing device (or computer) into a special-purpose computing device when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for optimizing supply of rental vehicles, the system comprising:
 a processor; and
 a memory disposed in communication with the processor and storing processor-executable instructions, which when executed by the processor, cause the processor to:
  receive customer data associated with a plurality of customers from a plurality of sources, the customer data including transaction data, flight data, and vehicle rental data;
  for each of the customers:
   determine whether the customer is associated with a vehicle rental, based on the flight data and the vehicle rental data of the customer;
   in response to a determination that the customer is associated with a vehicle rental, exclude the customer;
   in response to a determination that the customer is not associated with a vehicle rental:
    classify the customer into one of a plurality of segments based on the transaction data of the customer, wherein each of the segments is indicative of vehicle rental preferences of customers classified in the segment; and
    determine a rental location for the customer, based on a destination location and a source location of the customer included in the transaction data and/or the flight data of the customer; and
  predict likely vehicle demand for different vehicles at multiple rental locations based on said classification and said determination of the rental location for each of the customers not associated with a vehicle rental.

2. The system as claimed in claim 1, wherein the customer data further comprises at least one of itinerary data, demographic data, location data, and lodging data.

3. The system as claimed in claim 1, wherein the data received from a plurality of sources includes one or more of: flight information, origin and destination data, class, travel date and time, transaction date, sequence number of the flight, vehicle rental information, and sequence number.

4. The system as claimed in claim 1, wherein the processor-executable instructions, when executed by the processor in connection with classifying the customer, further cause the processor to associate the flight data and the vehicle rental data with the transaction data.

5. The system as claimed in claim 1, wherein the processor-executable instructions, when executed by the processor, further cause the processor to predict a car type preference of the customer based on the classification of the customer and the source and destination location of the customer.

6. The system as claimed in claim 1, wherein the processor-executable instructions, when executed by the processor, further cause the processor to predict a car type preference of the customer and communicate the predicted car type preference to a vehicle rental merchant.

7. A method for optimizing supply of rental vehicles, the method comprising:
 receiving customer data associated with a plurality of customers from a plurality of sources, the customer data including transaction data, flight data, and vehicle rental data;
 for each of the customers:
  determining, by a computing device, whether the customer is associated with a vehicle rental, based on the flight data and the vehicle rental data of the customer;
  in response to the customer being associated with the vehicle rental, excluding, by the computing device, the customer;
  in response to the customer not being associated with the vehicle rental:
   classifying, by the computing device, the customer into one of a plurality of segments, based on the transaction data of the customer, each segment being indicative of vehicle rental preferences of customers classified in the segment; and
   determining, by the computing device, a rental location for the customer, based on a destination location and a source location of the customer included in the customer data; and
 predicting, by the computing device, likely vehicle demand for different vehicles at multiple rental locations based on said classification and said determination of the rental location for each of the customers that is not excluded.

8. The method as claimed in claim 7, wherein the customer data further comprises at least one of itinerary data, demographic data, location data, and lodging data.

9. The method as claimed in claim 7, wherein the data received from a plurality of sources includes one or more of: flight information, origin and destination data, class, travel date and time, transaction date, sequence number of the flight, vehicle rental information, and sequence number.

10. The method as claimed in claim 7, wherein classifying the customer further comprises associating the flight data and the vehicle rental data with the transaction data.

11. The method as claimed in claim 7, further comprising predicting a car type preference of the customer based on the classification of the customer and the source and destination location of the customer.

12. The method as claimed in claim 7, further comprising predicting a car type preference of the customer and communicating the predicted car type preference of the customer to a vehicle rental merchant in advance.

* * * * *